United States Patent
Nilsen et al.

(10) Patent No.: US 6,634,373 B1
(45) Date of Patent: Oct. 21, 2003

(54) METHOD AND EQUIPMENT CONCERNING PRESSURE DELIVERANCE SYSTEM FOR GAS OR LIQUID

(76) Inventors: Svein Nilsen, Bjorkveien 5A, N-8517 Narvik (NO); Halftan Nilsen, Vaaganveien 28, N-8310 Kabelvaag (NO)

( * ) Notice: Subject to any disclaimer, the term of this patent is extended or adjusted under 35 U.S.C. 154(b) by 0 days.

(21) Appl. No.: 10/030,129
(22) PCT Filed: Jul. 28, 2000
(86) PCT No.: PCT/NO00/00251
§ 371 (c)(1), (2), (4) Date: May 15, 2002
(87) PCT Pub. No.: WO01/14788
PCT Pub. Date: Mar. 1, 2001

(30) Foreign Application Priority Data

Aug. 3, 1999 (NO) .......................................... 19993767

(51) Int. Cl.⁷ ................................................. F17D 5/02
(52) U.S. Cl. .......................................... 137/12; 137/460
(58) Field of Search ................................ 137/456, 460, 137/486, 12

(56) References Cited

U.S. PATENT DOCUMENTS

| | | | | |
|---|---|---|---|---|
| 3,171,432 A | * | 3/1965 | Bard ............................ | 137/460 |
| 3,692,050 A | * | 9/1972 | Deters .......................... | 137/491 |
| 5,062,442 A | | 11/1991 | Stenstrom et al. | |
| 5,251,653 A | * | 10/1993 | Tucker et al. ................ | 137/460 |
| 5,752,544 A | * | 5/1998 | Yves ............................ | 137/461 |

FOREIGN PATENT DOCUMENTS

EP      0 622 584 A1      11/1994

* cited by examiner

Primary Examiner—Stephen M. Hepperle
(74) Attorney, Agent, or Firm—Dennison, Schultz & Dougherty

(57) ABSTRACT

A main water supply (1) is equipped with a main valve (2) followed by a first main pipe (3) running through a first check valve (4), and further to a first adapter (6) while a pilot pipe (7) runs from the main valve (2) through a secondary valve (9) and further a pilot coupling (16). A pressure pipe (12) runs to a secondary valve (9). From the first main pipe (3), a branch pipe (26) runs through a second check valve (28) to a water heater (27) and a second main pipe (29) runs to a second adapter (6.1) through a third check valve (30). A solenoid valve (17) is operated by a timer (18) or by the control signal of a household appliance. Pressure sensors (23, 33) signal of a household appliance. Pressure sensors (23, 33) signal to lamps (23, 34) on a panel(25).

8 Claims, 7 Drawing Sheets

METHOD AND EQUIPMENT CONCERNING PRESSURE DELIVERANCE SYSTEM FOR GAS OR LIQUID

The invention relates to a monitoring system for leakage of fluid in a pressure supply system and provides a means of closing the fluid outlet and preventing damage. The types of pressure supply systems for which the invention is intended are water supply to buildings, water and gas-based fire-fighting sprinkler systems and gas supply for instance to hospitals. In other words, the system can be used for systems containing liquids (water, oil) and gases (fire-fighting gases, pneumatic gases). In the presentation of a preferred embodiment, the type used on water supply to buildings will be used as an example.

Damage caused by water leaks from water supply systems in buildings represents considerable loss and expenses to owners and insurance companies. Water leaks which are detected by a person shortly after occurring can be stopped and the damage limited. Minor water leaks occurring in pipework running inside walls, ceilings or under floors are more difficult to detect and the resulting damage is therefore more extensive. Very small leaks may not be detected at all before the building materials have been invaded by fungus and mould or have started rotting. Major leaks may not even be detected before a certain time if the residents of the house are absent for a long period of time.

Damage caused by water leaks is often extensive because the water penetrates insulation material. In such cases, the only way to eliminate the moisture is to open the building structure, remove the wet insulation and replace it with new material. This results in extensive and costly repair work.

There exist only a few systems on the market today which can limit the damage caused by water leaks. Such safety systems are, in Norway, approved by the Norwegian Building Research Institute. Safety systems are divided into two main groups: active and passive systems. Passive systems monitor leaks and, when such a leak occurs, they give an auditory signal but take no action toward limiting the damage. Such systems are therefore not suitable for limiting damage when the building is empty and no one is on the premises to cut off the water supply.

Active systems detect leaks and cut off the water supply and are, in this respect, much more efficient at limiting water-related damage.

The active systems are classified into two categories: category 1 which detect and close off leaks in pipework and in household appliances, and category 2 which are active only in regard to household appliances. Until recently there was only one approved system in category 1 on the Norwegian market. This system consisted of a water gauge, a shut off valve and an electronic control device. When the system was installed in a house, information on the daily water consumption was programmed in the control device, based on the anticipated daily water consumption for the whole house. In the event of a leak, the system would at worst allow the water to continue leaking until the equivalent of one programmed day's consumption had leaked out. In a house where the residents are absent on holiday for instance, such a system would allow an unnecessary quantity of water to leak out before the supply is cut off. This type of system is rather inappropriate and unsuitable for reducing damage caused by water leaks to a minimum.

In category 2 of active systems, several systems are available which operate in about the same manner. These systems consist of a central control unit which is installed in the vicinity of the water intake to the building and a controllable shut off valve. From this control unit and to each of the household appliances or places where monitoring of possible water leaks is required—for example, on the floor close by a dishwasher, a washing machine built-in a sink unit or the like—are installed electrical connections to water sensors which detect any water spill thus enabling the control unit to cut off the water supply by closing the shut off valve.

None of the described or known water-leak detection systems can monitor all the parts of the pipework in a water supply system, detect water leaks and immediately cut off the leak.

The object of the system of the present invention is to provide a solution which takes the following requirements into account:

register the slightest leak in any part of the water supply system in a building, whether on the hot or cold water supply, cut off the intake of water from outer sources very shortly after the leakage has been registered, control the intake from the water main and close off this intake when there is no consumption of water, convey to the user the necessary information about the leak, the system must be reset before water can be drawn again.

The above is achieved by closing off the intake of fluid into the pressure system and the pressure drop signal which is registered on opening a faucet or a valve is designed to open the intake if the pressure in the distribution line downstream of the intake exceeds a certain threshhold value.

Further details of the invention appear from the following description of a preferred embodiment of the invention with reference to the illustrations.

DESCRIPTION OF THE SYSTEM

Figure 1:
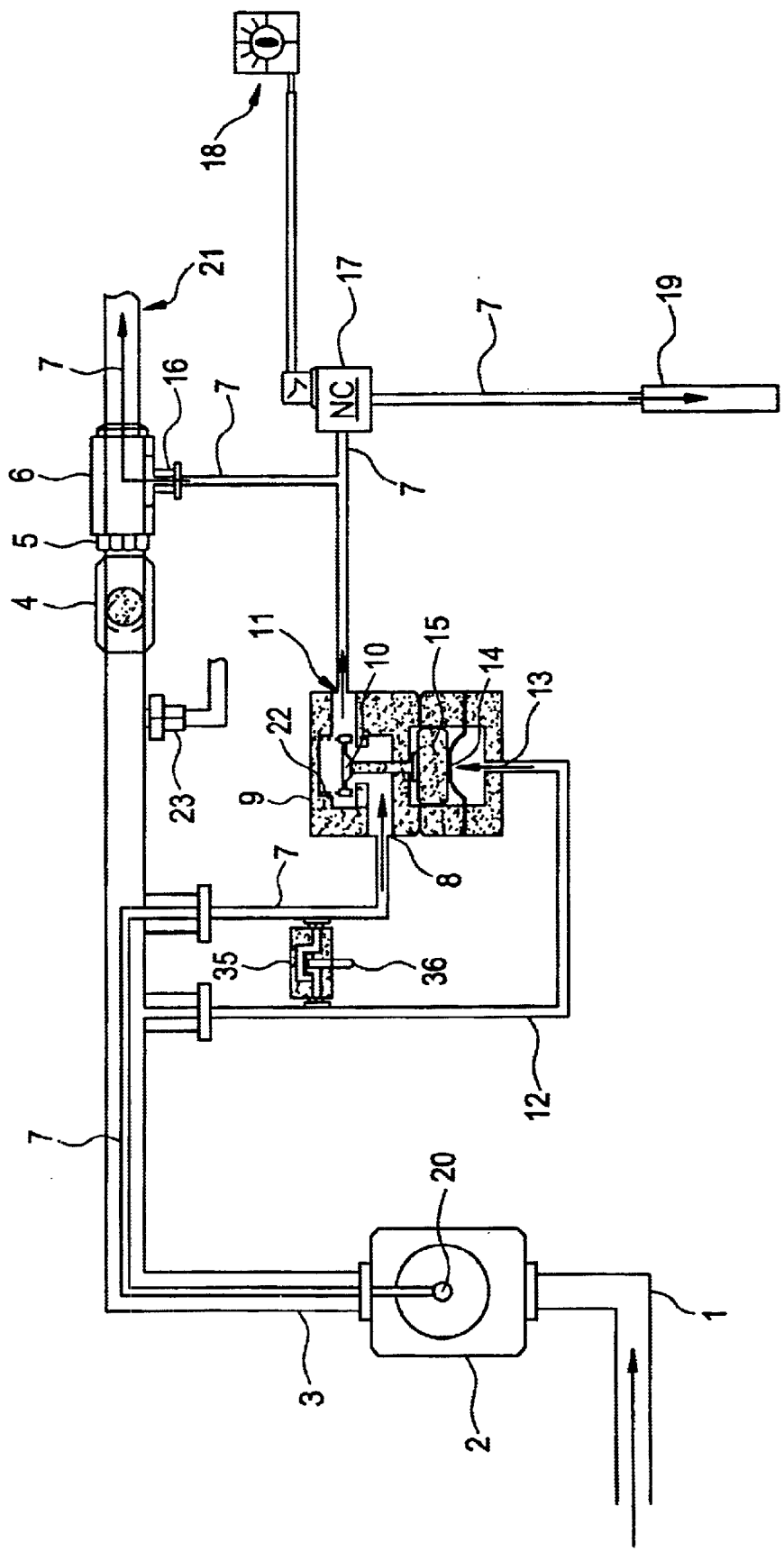
FIG. 1 illustrates the system of the invention installed in a water supply system comprising a main pipe supplying a building and a situation where the secondary valve is shown operating in a leak-free system.

FIG. 1 shows the system of the invention in connection with a simple single-pipe water supply system in a residential house. The principle of the invention is explained in relation to this example. The water supply network consists of a main supply 1 arriving from an outer water main and a main valve 2 which, when water is not being drawn or when there are no water leaks, is normally closed. Downstream of the main valve 2, a first main pipe 3 runs to a first check valve 4 and further to a cold water intake 5 on a first adapter 6. The adapter 6 is simply a T-pipe with couplings. All check valves are of the spring-loaded type.

The main valve 2 is provided with a discharge hole 20 (cf. FIG. 5) from which a pilot pipe 7 runs to a pilot inlet 8 on a secondary valve 9. With the help of a pilot valve 10, a passage can be created between the pilot inlet 8 and a pilot oulet 11. A pressure pipe 12, which branches off from the first main pipe 3, is connected to a pressure inlet 13 on the secondary valve 9. The pressure in the pressure pipe 12 acts on a first diaphragm 14 which operates a piston 15 mounted on the same rod as the pilot valve 10.

The pilot pipe outlet 11 is connected to a pilot coupling 16 on the cold-water intake 5 on the first adapter 6 and to a solenoid valve 17 which is itself connected to a timer 18. From the solenoid valve 17, the pilot pipe 7 runs to a drain pipe 19.

Figure 2:
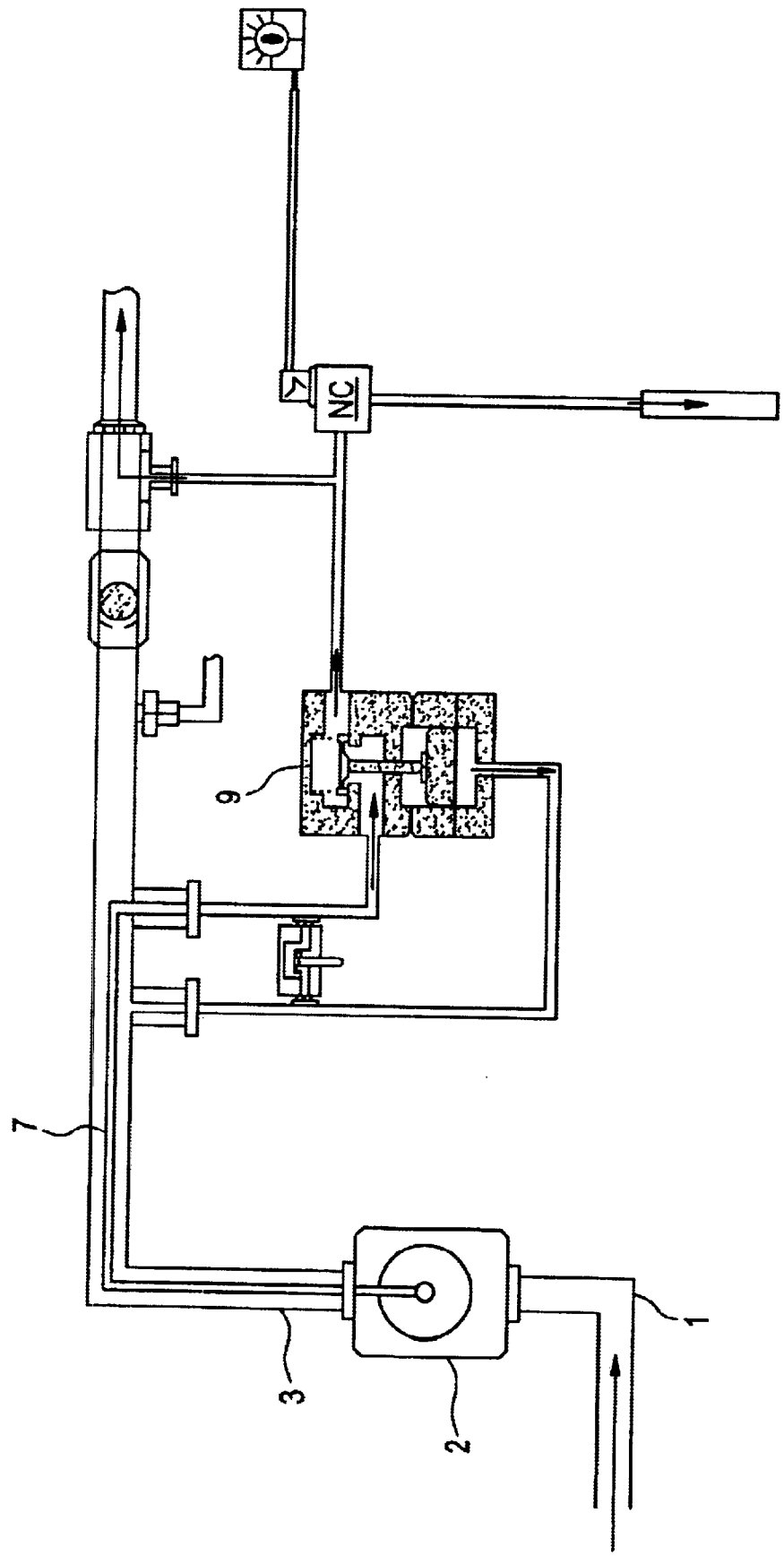
FIG. 2 illustrates the same system as above but, on this figure, the secondary valve is shown operating in a situation where a leak has been detected.

FIG. 1 shows the operating position of the secondary valve 9 when there is pressure in the system, while FIG. 2 illustrates what happens in the absence of pressure in the system.

Main Valve

Figure 5:
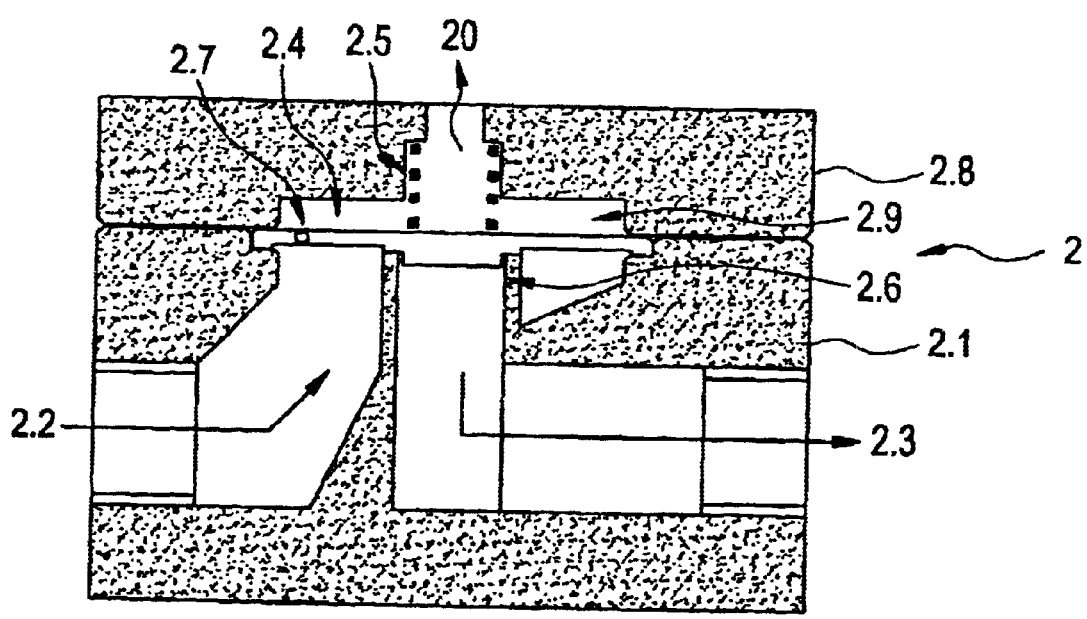
FIG. 5 is a schematic illustration of the main valve in a closed position when no water is drawn or when a leak has been detected.
Figure 6:
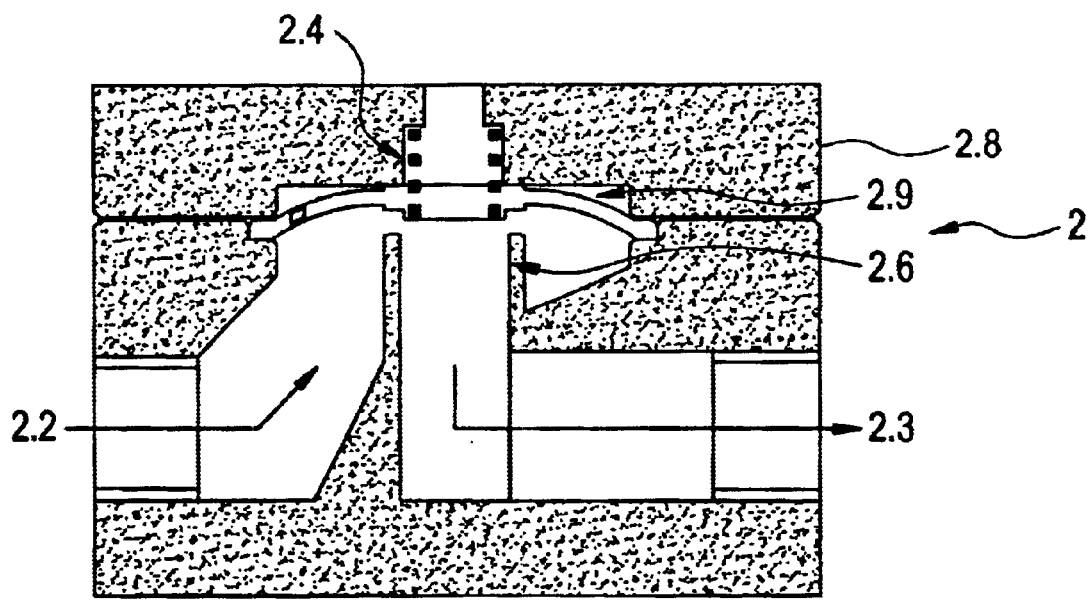
FIG. 6 is the same schematic illustration as above but in this case water is being drawn normally from the water main and the main valve is open.

FIGS. 5 and 6 show a sectional view of the main valve 2 in closed and in open position. The main valve 2 consists of a valve housing 2.1, an inlet 2.2, an outlet 2.3, a second diaphragm 2.4, a diaphragm spring 2.5 and a valve seat 2.6. In the second diaphragm 2.4, close by the inlet 2.2, a weep hole 2.7 is provided. The discharge hole 20 is located in a top part 2.8 provided on the valve housing 2.1. When, in the valve housing 2.1, the space above the second diaphragm 2.4 is closed off, i.e. the discharge hole 20 is closed, the pressure entering through the inlet 2.2 will be exerted on parts of the surface of the diaphragm 2.4 and against the diaphragm spring 2.5 in an attempt to create a flow to the outlet 2.3. This pressure is also propagated through the weep hole 2.7 to the water trap 2.9 above the second diaphragm 2.4 and, there, it will be exerted on the entire surface of the second diaphragm 2.4 in order to close it. The second diaphragm 2.4 will close tightly as long as the space above it is closed off and not evacuated. If a pressure drop occurs in the outlet 2.3, the second diaphragm 2.4 will remain even more tightly shut.

Secondary Valve

The water under pressure which arrives from the first main pipe 3 and reaches the secondary valve 9 maintains a free flow between the pilot inlet 8 and the pilot outlet 11 by maintaining the pilot valve 10 in an open position. The pressure will remain sufficiently high to maintain the pilot valve 10 in an open position when the water supply pipe network is intact and when water is drawn through a faucet 21 and various household appliances. If the pressure in the system drops so that the pilot valve 10 closes through the action of the valve spring 22, the space above the second diaphragm 2.4 in the valve housing 2.1 will not be able to empty through the pilot pipe 7 and the main valve 2 will not be able to open and let the water flow to the first main pipe 3.

Description of the Operation of a Single-pipe Supply Ssystem

When no water is drawn from the first main pipe 3 or when no household appliance such as a washing machine is running, the main valve 2 is closed and the secondary valve 9 is open. The pilot pressure in the space above the second diaphragm 2.4 is not relieved. When the faucet 21 connected to the first main pipe 3 is opened, the pilot pressure in the space above the second diaphragm 2.4 in the main valve 2 is relieved and the incoming water pressure, from the inlet 2.2, exerted on the second diaphragm 2.4 will open for the water to flow to the outlet 2.3. and to the faucet 21.

Figure 7:
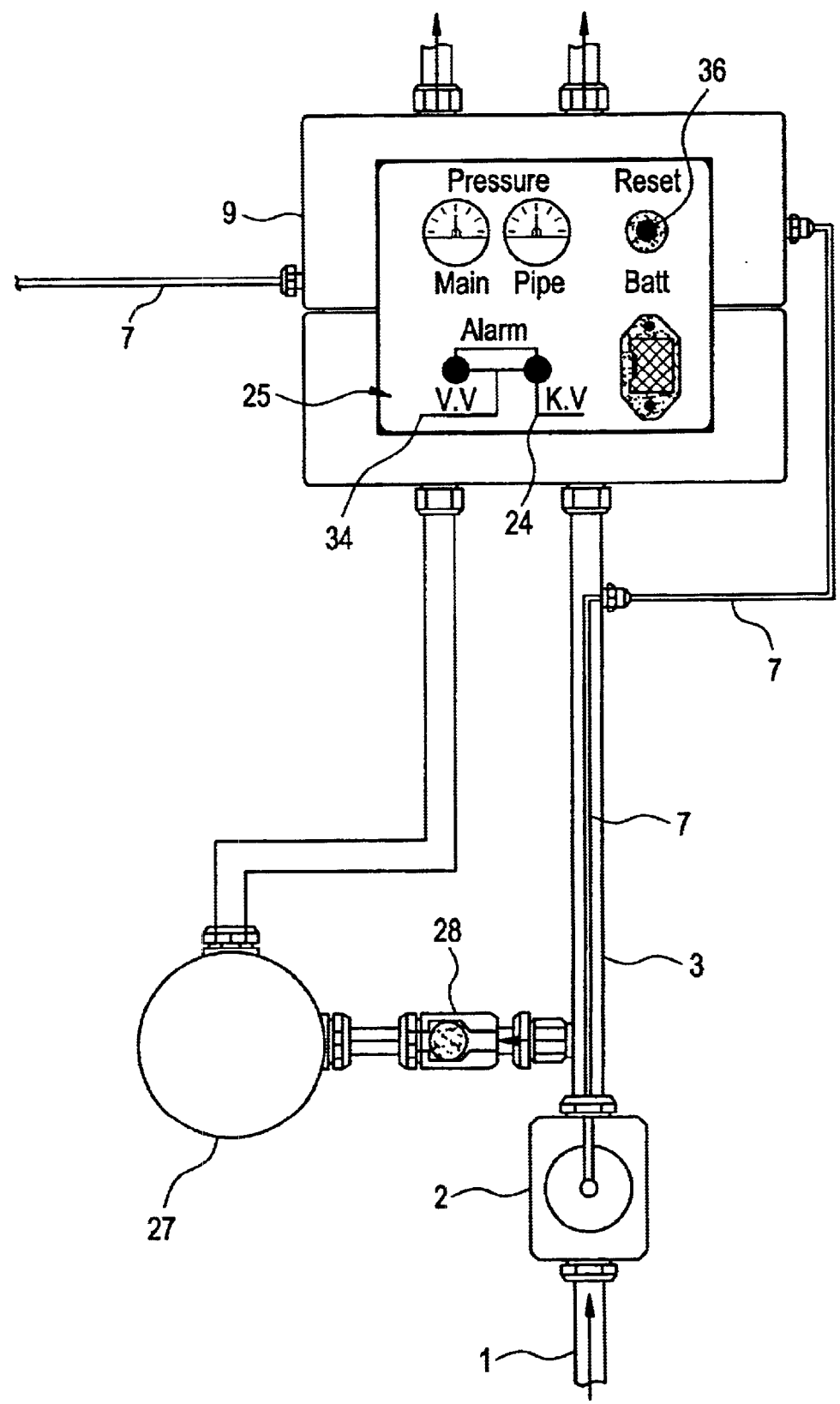
FIG. 7 illustrates the display and reset panel for the system.

If a small leak occurs in the first main pipe 3 or in water connections associated with it, the pressure in the system will gradually drop, thereby inducing closing of the secondary valve 9. The pilot pressure in the space above the second diaphragm 2.4 will therefore no longer be allowed relief through the secondary valve 9, regardless of any degree of opening of the faucet 21, and only a minimal quantity of water will be allowed to leak at the place where the leak occurred. A first pressure sensor 23 is provided on the first main pipe 3 and sends a signal to a first lamp 24 on the panel 25 shown on FIG. 7 when the pressure in the first main pipe 3 is too low.

In the event of a pressure drop in the system due to leakage, the first check valve 4 will prevent the pilot pressure from acting on the pressure in the system before the secondary valve 9 has closed. In other words, the pilot pressure will be prevented from attempting to maintain the pressure in the system.

Description of the Operation of a Double-pipe Supply System

Figure 3:
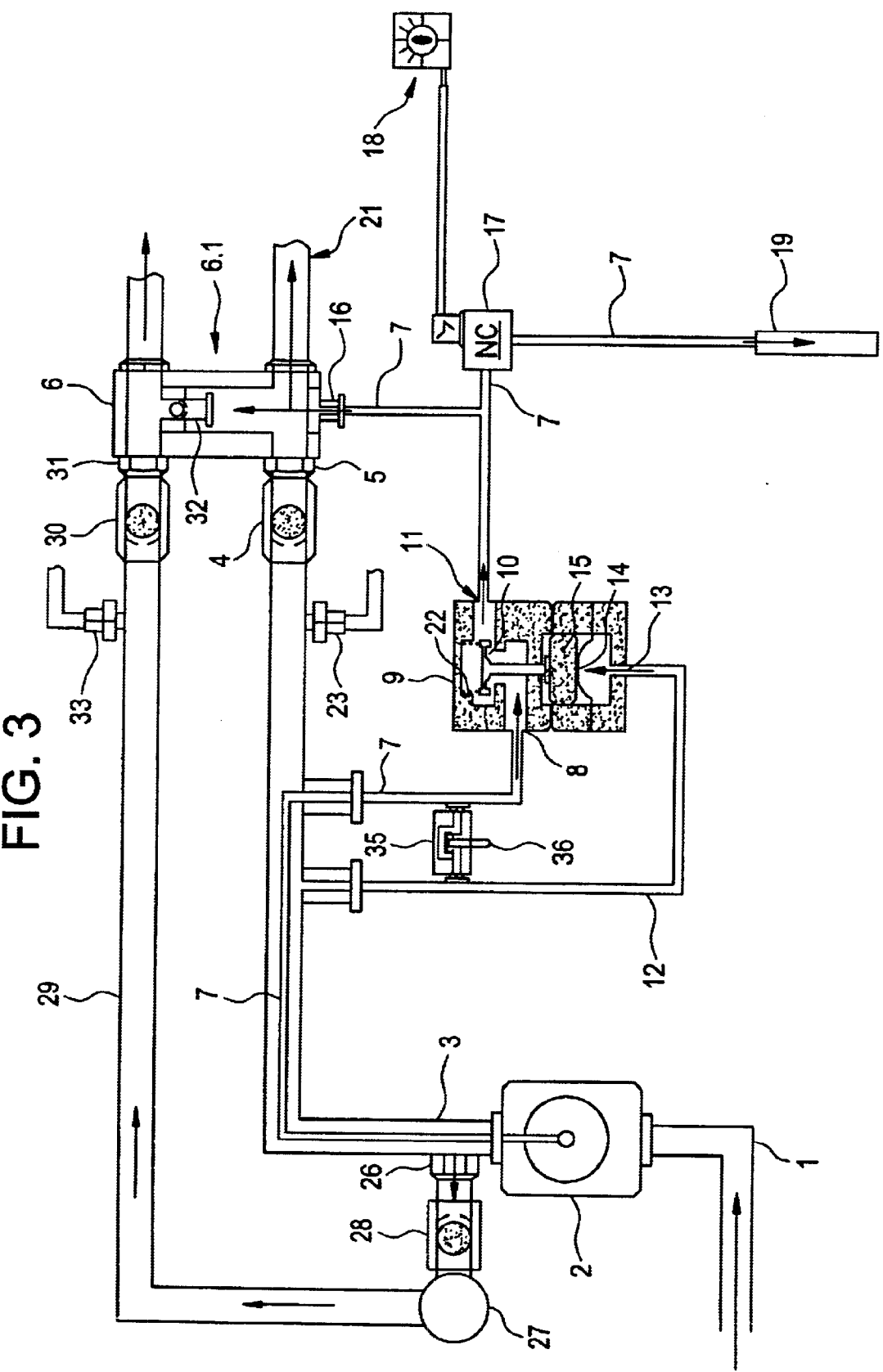
FIG. 3 illustrates an example of the application of the device of the invention in a water supply system, with distribution of hot and cold water and a connection to a household appliance, such as a washing machine, the secondary valve being shown operating in a leak-free system.
Figure 4:
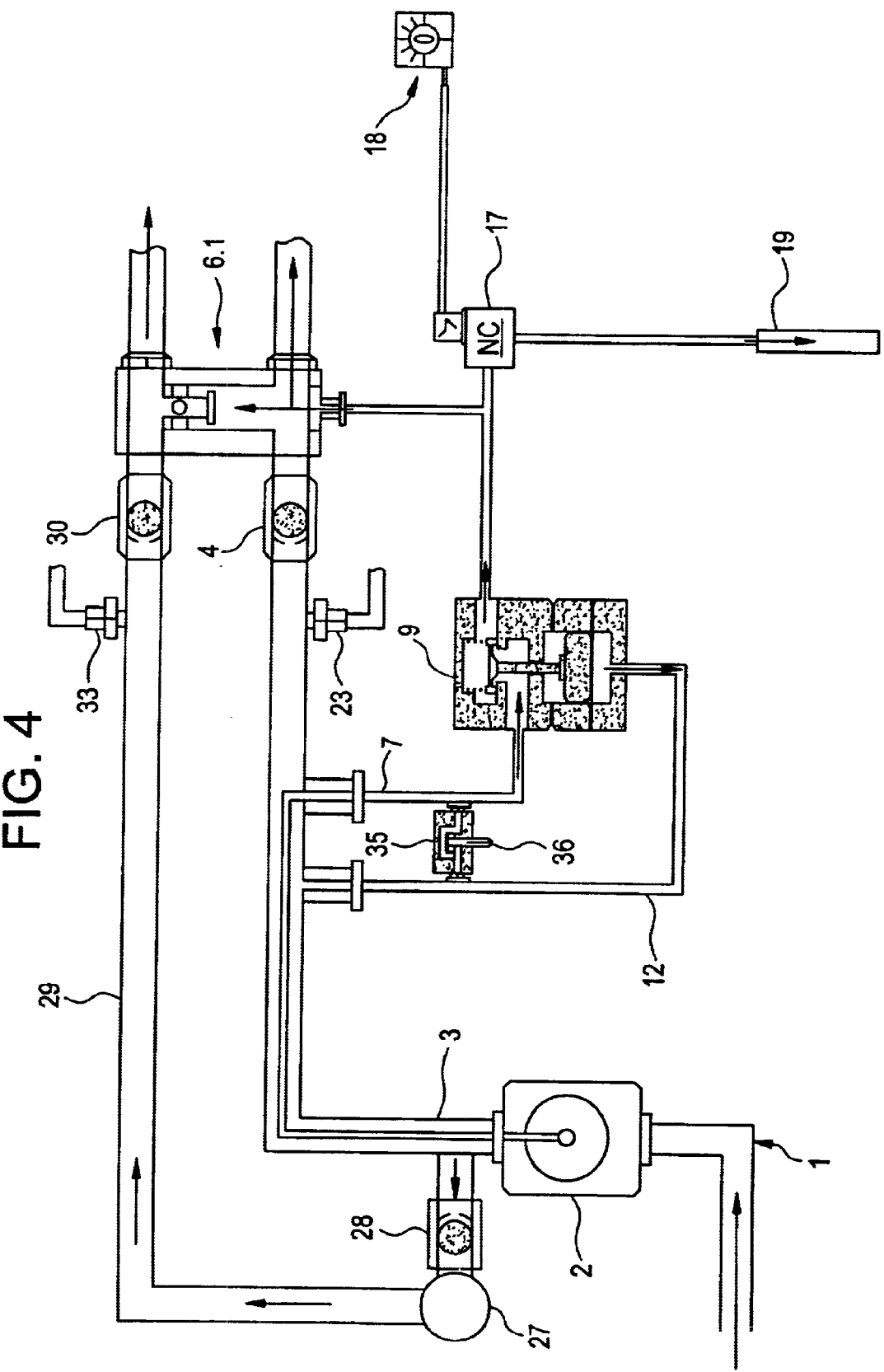
FIG. 4 illustrates the same system as above but, on this figure, the secondary valve is shown operating in a situation where a leak has been detected.

FIGS. 3 and 4 illustrate a double-pipe supply system for hot and cold water.

A first branch pipe 26 is provided on the first main pipe 3 immediately downstream of the main valve 2 to supply cold water to a water heater 27 through a second check valve 28. From the water heater 27, a second main pipe 29 is provided which runs to a third check valve 30 and to a hot water intake 31 on a second adapter 6.1.

Let us assume that a leak has been detected in the first main pipe 3 as described above in the presentation of the single-pipe supply.

In the second adapter 6.1, a one-way pressure coupling is provided between the cold water intake 5 and the hot water intake 31 through a fourth check valve 32.

The second main pipe 29 is still under pressure as the fourth check valve 32 prevents a pressure drop which might be due to the first main pipe 3. A second pressure sensor 33 provided on the second main pipe 29 is not activated to send a signal regarding the leak to its second lamp 34 on the panel 25. The fourth check valve 32 is also intended to prevent the flow of hot water into the cold water supply when cold water is being drawn from the first main pipe 3.

Leak in the Second Main pipe or in the Water Heater

In the event of a leak which would only occur in the second main pipe 29, in the water heater 27 or in any household appliance connected to these, the result would be a pressure drop in the second main pipe 29, triggering the second pressure sensor 33. Further, a pressure drop would occur in the first main pipe 3 through the second check valve 28, and the first pressure sensor 23 would also trigger an alarm signal.

Resetting the System

When the leak has been located and repaired, the system is reset by pressing a reset button 36. This implies that the secondary valve 9 is closed and that the pilot inlet 8 is under pilot pressure. Between the pilot pipe 7 and the pressure pipe 12, a bypass connection is provided consisting of a reset valve 35 with a reset button 36 providing a connection between the two pipes which may be opened to send the pilot pressure through the secondary valve 9 and restore the system pressure in the main pipe 3, 29, and the lamp 24, 34 will be switched off.

Drawing water in household Appliances

The solenoid valve 17 can be operated by the signal which operates the program-driven valve found in a washing machine or a dishwasher. When the machine program sends the operation signal to the machine's solenoid valve which opens the water inlet supplied by one of the main pipes 3, 29, the same signal will be able to open the solenoid valve 17 and release the pilot pressure in the main valve 2 so that the household appliance can be supplied with water.

Drawing Water With Volume Control

The solenoid valve 17 can also be operated in order to open or to remain open over a certain period of time, for instance, if the timer 18 is installed in a bathroom and is preset to a certain number of minutes when the pilot pressure can be released and water can be drawn, for example in a bath tub. In other words, it is possible to use the timer 18 to regulate the length of time when water will be drawn in the bath tub, implying that the timer 18 can be preset to a certain number of minutes, the taps can be opened and one can leave the bathroom without any danger of the bath tub overflowing. This system is particularly suitable for elderly people or other persons who may have difficulty remembering that they started to run a bath, and leave the bathroom forgetting that water is still running.

The figure illustrates that the pilot pipe 7 is run inside the first main pipe 3 from the main valve 2 to the secondary valve 9. The pilot pipe 7 can also be run between these two devices on the outside of the first main pipe 3.

The adapters 6, 6.1 are positioned as close as possible to the water outlets and faucets being supplied by the main pipes 3, 29 in order to provide monitoring of leakages on most of the pipe system, as the system pressure 12 is diverted upstream of the adapters 6, 6.1.

In the event of leakage in the main pipes 3, 29 occurring simultaneously as the drawing of water in a washing machine, i.e. while the solenoid valve 17 is open, the system pressure will not succeed in maintaining the secondary valve 9 open and the main valve 2 will close.

What is claimed is:

1. Method for controlling the supply of a fluid from a pressure system and for monitoring leakages characterized in that the supply of fluid of the pressure system is closed by a main valve (2) which:

a) opens for the fluid to a first main pipe (3) if
      a pressure drop signal which produces by drop in the pressure in the first main pipe (3) when at least one valve is opened which are connected to the first main pipe (3) and at the same time
      the pressure in the first main pipe (3) is registered to be higher than a threshold value when at least a valve is opened, and
   b) closes for the fluid into the first main pipe (3) if
      a pressure drop signal which produces when the pressure is dropping in the first main pipe (3) when at least one valve is opened which is connected to the first main pipe (3) and at the same time
      the pressure in the first main pipe (3) is registered to be lower than a threshold value when at least one valve is opened.

2. A system for controlling the supply of a fluid from a pressure system and for monitoring fluid leakage in accordance with the method of claim 1, characterized in that on a main supply (1), a main valve (2) is provided from which a first main pipe (3) runs through a first check valve (4) to a cold water inlet (5) on a first adapter (6), and from the main valve (2) a pilot pipe (7) runs to a pilot inlet (8) at a secondary valve (9) and out from this, via a pilot valve (10), by a pilot outlet (11) to the first adapter (6), and further there is a pressure pipe (12) running from the main pipe (3) to a system pressure inlet (13) at the secondary valve (9) where the system pressure influences a piston (15) which further by a firm connection influences the pilot valve (10) to be opened.

3. The system for controlling the supply of a fluid from a pressure system of claim 2, characterized in that, from the first main pipe (3) a branch pipe (26) runs to a second check valve (28) and further to a water heater (27) from which a second main pipe (29) runs to a hot water intake (31) on a second adapter (6.1) through a third check valve (30).

4. The system for controlling the supply of a fluid from a pressure system of claim 3, characterized in that in the second adapter (6.1) a fourth check valve (32) is provided between the cold water intake (5) and the hot water intake (31).

5. The system for controlling the supply of a fluid from a pressure system of claim 3, characterized in that a reset valve (35) equipped with a reset button (36) is provided between the pressure pipe (12) and the pilot pipe (7) and by pressing the reset button (36) is setting up a connection between the pilot pipe (7) and the pressure pipe (12) and re-establish the system pressure in the first main pipe (3) after the pressure drop.

6. The system for controlling the supply of a fluid from a pressure system of claim 2, characterized in that a solenoid valve (17), which can be operated by a timer (18) or by a signal from a household appliance, is provided on the pilot pipe (7) between the secondary valve (9) and the pilot coupling (16).

7. The system for controlling the supply of a fluid from a pressure system of claim 2, characterized by a first pressure sensor (23) provided to send a signal to a first lamp (24) on a panel (25) when the pressure in the first main pipe (3) is too low.

8. The system for controlling the supply of a fluid from a pressure system of claim 3, characterized by a second pressure sensor (33) provided to send a signal to a second lamp (34) on a panel (25) when the pressure in the second main pipe (29) is too low.

* * * * *